Sept. 25, 1934.  G. E. SCHMIDT  1,975,021

FRICTION DEVICE FOR EXERCISERS

Filed April 30, 1932

Inventor:
Gustav E. Schmidt
By Cheever, Cox & Moore
Attys.

Patented Sept. 25, 1934

1,975,021

UNITED STATES PATENT OFFICE 1,975,021

FRICTION DEVICE FOR EXERCISERS

Gustav E. Schmidt, Chicago, Ill.

Application April 30, 1932, Serial No. 608,351

7 Claims. (Cl. 272—72)

This invention relates to friction devices for exercising machines, such as rowing machines, the present invention being an improvement of my copending application, Serial No. 601,075, filed March 25, 1932.

The primary object of the present invention is to provide a positively operating adjustable friction device which will create a frictional drag on a member upon movement of the device on the member in one direction, but which has absolutely no resistance upon movement in a reverse direction.

Numerous other objects are the provision of a frictional device for use in connection with exercisers, such as rowing machines, the device including a fixed braking member and a loosely positioned member which are slidably mounted on a fixed rod; the provision of contacting rollers for creating friction against a fixed rod by friction elements; the provision of an adjustable member so that the position of the rollers relative to the casing may be varied so as to vary the friction; the provision of means for returning the elements so that positively no friction exists on the return movement of the device; and the provision of elements positioned and located in a particular position, the parts being arranged to perform frictional engagement upon movement in one direction but permitting frictional engagement upon movement in the other direction.

Numerous other objects and advantages will be apparent throughout the progress of the following specification.

The accompanying drawing illustrates a selected embodiment of the invention and the views therein are as follows:

Fig. 7 is a longitudinal sectional view of a modified form of friction device.

Figure 1:
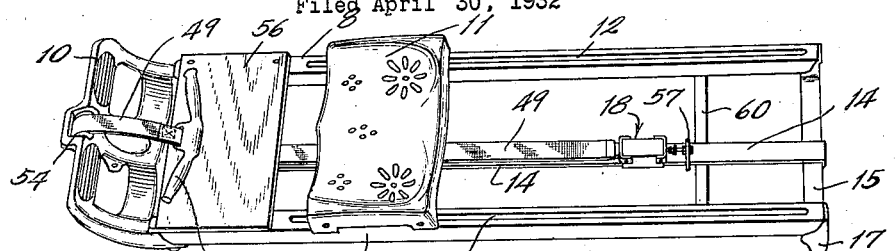
Fig. 1 is a detail perspective view of a rowing machine and embodying the invention.

The rowing machine herein shown comprises a frame 7 which includes spaced rails 8 which are connected at their ends by a cross member 9 and at their forward ends by a prow 10. The spaced rails 8 provide a slide for a form-fitting seat 11. The rails are preferably provided with grooves 12 which form a track upon which the seat support is movable. The seat is provided with wheels 13 which operate in the tracks 12 and are guided thereby. The frame 7 is preferably made inclined, as shown, so that the seat 11 will slide forwardly when not in use. This inclination of the frame assists in making the device capable of giving a true rowing motion or action.

A longitudinal rod or bar 14 is arranged between the rails 8 and has its front and rear ends 15 bent to engage the cross braces 16. Rests or feet 17 are mounted on opposite sides of the device and are arranged so as to give proper inclination to the frame 7. A resistance element 18 cooperates with the bar or rod 14 for the purpose of providing the proper amount of resistance on the operating or pulling stroke of the exerciser. This resistance element 18 comprises a casing 19 having an end 20 in which there are provided openings 21 and 22. The opposite end 23 of the casing is provided with an opening 24 which is in alinement with the opening 22 in the end 20. The rod or bar 14 extends through the alined openings 24 and 22 when the element 18 is arranged in proper operable position. Elements 25 and 26 are arranged inside of the casing below and above, respectively, of the rod or bar 14 and in normal contacting engagement therewith. The elements 25 and 26 are for the purpose of creating or maintaining a friction on the resistance or friction bar 14 and are preferably made of material, the same as or similar to that from which automobile brake linings are made, although any other material may be used for creating the desired effect. The friction lining element 25 is fixed to the casing in any convenient manner, such as by riveting the same, as indicated at 27, to the bottom wall 28 of the casing. The friction resistant element 26 is preferably fixed to a plate 29 in any convenient manner, such as by rivets 30, and is prevented from longitudinal movement due to engagement with the end walls 20 and 23 of the casing.

The friction elements 25 and 26 may be of any convenient width, but in the present instance they are shown as being substantially the same width as the interior cross sectional dimension of the casing 19.

A bar 31 is mounted on top of the plate 29 and has a slot 32 provided therein. Abutment flanges 33 and 34 are fixed to the bar 31 and are arranged on opposite sides of the slot 32.

A roller 35 is arranged in the slot 34 of the plate 29. This roller 35 is for the purpose of causing friction to be applied on the rod or bar 14 during the pulling or power stroke of the device. This roller also assists in overcoming and preventing friction during the return stroke of the device. An upper roller 36 is arranged between the flanges 33 and 34 and has contacting rolling engagement with the lower roller 35. The roller 36 normally occupies the position shown in Fig. 3, but engages the inclined portion 37 in the upper wall 28 of the casing 19 during the pulling stroke, the bar 31 and the cooperating rollers being free to move longitudinally a predetermined distance to cause engagement of the roller 36 with the inclined portion 37 during the pulling stroke. The inclined portion 37 may comprise a wedge suitably fixed to the inside of the upper wall of the casing, or it may comprise a downwardly struck portion, as shown in the drawing. When the roller 36 is impinged between the part 37 and the top of the roller 35, the bar or plate 29 will be pressed downwardly swinging the brake elements 25 and 26, together so as to create a friction on the bar 14.

Figure 3:
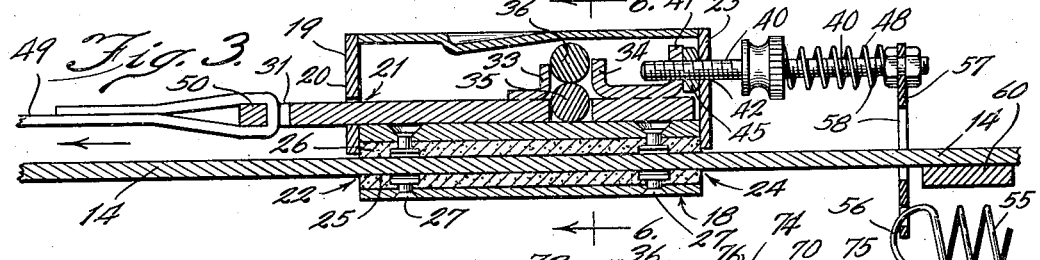
Fig. 3 is a longitudinal sectional view through the friction device on the line 3—3 of Fig. 6, the parts being shown in non-frictional engagement, such as when the device is being returned to original position.
Figures 4, 6:
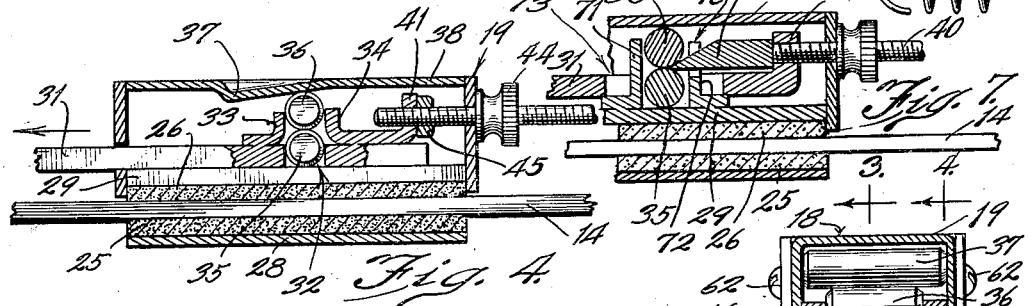
Fig. 4 is a detail sectional view on the line 4—4 of Fig. 6 and showing the device in frictional engagement.
Fig. 6 is a transverse sectional view on the line 6—6 of Fig. 3.
Figure 5:
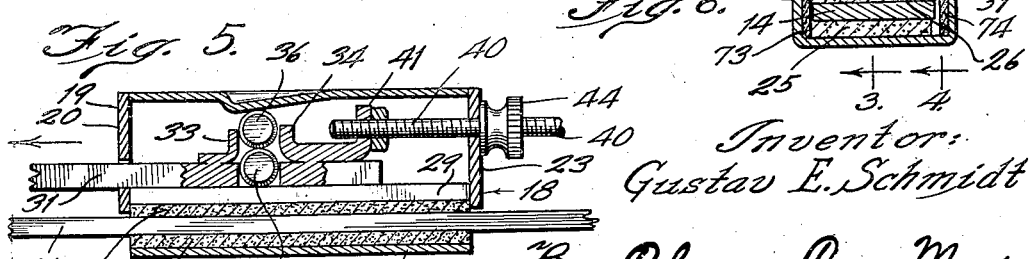
Fig. 5 is a view similar to Fig. 4 showing the device adjusted to provide greater frictional engagement on the rod, or adjusted to compensate for wear.

An adjustable element 39 is provided for the purpose of varying the resistance on the bar 14, and this element comprises a threaded stem or rod 40 which is fastened to the flange 41 of the member 34. The threaded rod 40 extends through an opening 42 in the end wall 23 and carries a thumb nut 44 for the purpose of permitting longitudinal movement of the rod or bar 31 to move the rollers further away or closer to the inclined portion 37, thereby causing greater or less impingement of the roller 36, with the inclined part 37 and thereby consequently increasing or decreasing the frictional resistance on the bar 14 by the friction elements 25 and 26. A lock nut 45 is fastened to the rod 40 and is arranged inside of the casing 19, as shown in Figs. 3 to 5, for the purpose of locking the rod 40 to the rod 31, also for the purpose of maintaining the rollers in proper position relative to the inclination 37. The thumb nut 44 is arranged exteriorly of the casing and has threaded engagement with the rod 40, the adjustable movement of this nut being limited between the wall 23 of the casing and a flange or abutment 46 formed near the end of the rod 40. A spring 48 is arranged between the abutment 46 and the nut 44 to maintain the nut in its adjusted position.

The friction stroke of the device is in the direction shown by the arrows, Figs. 3 to 5, friction being accomplished by a pull on the flexible member 49 which is fixed to the bar or rod 31, as indicated at 50, Fig. 3. The flexible member 49 passes around the pulleys 51 and 52 and has a handle 53 fixed at its free end for the purpose of being grasped and pulled by any one using the exerciser. The flexible element extends through a slot 54, Fig. 1, provided in the prow 10. Thus, when resistance, such as a pull, is applied to the flexible member 49, the resistance element 18 will be moved along the rod or bar 14, the same operating under friction during the pulling or exercising stroke. When the end of the stroke is reached, the resistance or pulling pressure is released permitting a spring 55 to return the device 18. The spring 55 is positioned below the bar 14 and has its end 56 fastened to a member 57. The member 57 is fixed to the rod 40 and is provided with a slot 58 through which the bar 14 extends. The other end of the spring 55 is fastened to a part of the frame, as indicated at 59, Fig. 2. The spring 55 returns the friction element to normal position, which is the position shown in Fig. 2.

Figure 2:
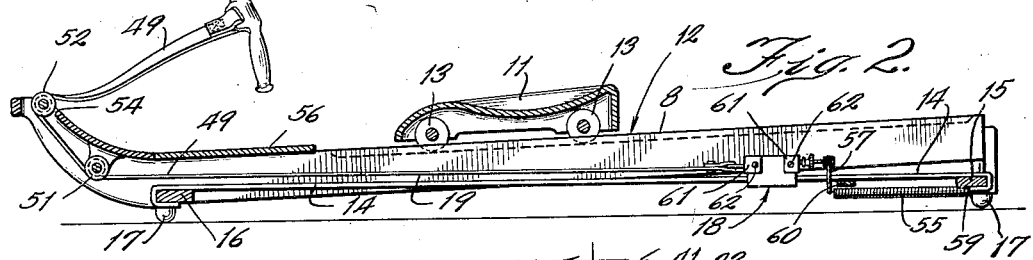
Fig. 2 is a detail sectional view thereof.

Turning movement of the thumb nut 44 causes the friction on the rod 14 to be increased or decreased. If more friction is required, the thumb nut 44 is backed off providing greater space between the nut 45 and the thumb nut 44 and moving the rollers 35 and 36 closer to the incline 37 on the casing. This movement permits greater impinging action on the roller 36 and tends to force the roller 35, and consequently the friction member 26, downwardly against the rod 14, and the rod 14 against the friction element 25. Therefore, when the nut is backed off, the friction on the rod 14 is greatly increased, while normal screwing or tightening movement of the thumb nut will move the rollers further away from the incline 37, permitting them to be free and kept from engagement with the incline portion 37, thereby preventing wedging action from occurring. Fig. 3 shows the rollers in the position they will assume during the return stroke and also the position the parts will assume. In Fig. 4 the thumb nut 44 has been backed off somewhat so as to move the rollers closer to the incline portion 37, thereby causing greater friction to be exerted on the rod 14. This friction occurs only in the beginning stroke which is the direction shown by the arrow in Fig. 3. At the end of the exercising stroke, the spring 55 will pull the rod 31 a slight distance to the right, the distance being equal to the space between the nut 45 and the thumb nut 44, at which time the roller 36 is away from the incline portion 37. The parts will then again assume the position shown in Fig. 3. During the return stroke, the spring 55 will pull the device 18 until the nut 45 engages the inside of the casing wall 23, thereby returning the device 18 to its normal position. During the pulling or exercising stroke, the friction device 18 will be moved forward to the left, Fig. 2, along the rod 14 a distance equal to the length of the pull on the handle. At the end of the exercising stroke when the pull on the handle is discontinued, the spring 55, which has been expanded during the pulling stroke, will return the friction device 18 to its normal position, as shown in Figs. 1 and 2.

A cross piece 60 is fastened to the rails and to the rod or bar 14 rearwardly of the device 18 to strengthen the rowing machine and to brace the rod 14.

The exerciser is also provided with a standing plate permitting a person to stand on the plate and operate the exerciser so that it may be used for purposes other than a rowing machine, such as for instance, standing and bending exercises.

The end walls 20 and 23 of the casing may be removable, as shown, having side ears 61 which are fastened to the casing by means of screws 62.

Arch straps (not shown) but of the type set forth in the copending application, may be fastened to the prow of the exerciser to permit the feet of the person to be engaged thereby.

In Fig. 7 there is shown a modified form of device in which the inclined portion of the casing 37 is eliminated, the casing having a flat top, as indicated at 70. Upstanding angles 71 and 72 are fixed to the plate 29 and extend upwardly through a relatively wide slot 73 in the bar 31, both of the rollers 35 and 36 being supported between the angles, the lower roller 35 being arranged in the slot 73 and bearing against the top of the plate 29. A wedge 74 is fixed to an upturned flange 75 on the bar 31 and is held in position by the threaded rod 40. This wedge extends through a slot 76 formed in the flange of angle 72 and is adapted to split the rollers 35 and 36 so that during operation of the device the roller 36 will be impinged between the lower surface of the top and the upper surface of the wedge, causing the roller 35 to be pressed against the plate 29 and exert braking action on the bar 14 by the braking members 25 and 26.

Strips 73 and 74 may be positioned along the sides of the casing, as shown in Fig. 6, to prevent any of the parts of the device from coming in direct contact with the metal walls of the casing. The material from which the strips 73 and 74 are made is fiber or other similar material capable of reducing friction and heat.

The invention is characterized by the fact that no friction is provided on the rod or bar 14 during the return stroke, the only purpose of the spring 55 is to return the device 18. The spring 55, therefore, can be made very light as it only needs to return a weight equal to the weight of the device 18. Furthermore, the present device will not heat up during constant operation due to the rolling engagement of the roller 35 on the plate 29. The device is positive in operation and all sticking is prevented at the end of the exercising stroke. In conventional devices some means must be provided to overcome the binding effect or wedging action created by engagement with the incline surface 37. However, the provision of the contacting rollers, one of which engages the incline portion 37 and the other of which engages the member 29, eliminates all sticking and frictional engagement, but permits sufficient power to be exerted to cause impinging action and frictional engagement of the members 25 and 26 with the bar or rod 14.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A friction device comprising a rod, friction elements contacting with the rod, a pair of rollers for said device and normally engaging each other, and means causing a binding action of said rollers upon movement of said device on the rod in one direction and a non-binding action upon movement in a reverse direction.

2. An exercising device comprising a longitudinal rod, a friction device slidably positioned on said rod, friction elements engaging the rod, a bar for moving the device on the rod, said bar having a slot therein, a roller in said slot, and means engaging the roller for pressing the roller in a predetermined direction to cause said elements to impinge the rod.

3. An exercising device comprising a longitudinal rod, a friction device slidably positioned on said rod, friction elements engaging the rod, a bar for moving the device on the rod, said bar having a slot therein, a roller in said slot and adapted for engagement with a part of the friction element, a second roller positioned above the first roller and in constant engagement therewith, and means engageable with the second roller upon movement of the device in a predetermined direction to cause impingement of said rollers, said impingement causing the friction elements to grip the bar.

4. An exercising device comprising a longitudinal rod, a friction device slidably positioned on said rod, friction elements engaging the rod, a bar for moving the device on the rod, said bar having a slot therein, a roller in said slot, a second roller positioned above the first roller and in constant engagement therewith, said casing having an inclined portion against which the second roller engages upon movement of the device on the rod in a predetermined direction, said engagement causing pressing action of the first roller and consequent gripping of the rod by the friction elements.

5. An exercising device comprising a longitudinal rod, a friction device slidably positioned on said rod, friction elements engaging the rod, a bar for moving the device on the rod, said bar having a slot therein, a roller in said slot, a second roller positioned above the first roller and in constant engagement therewith, an inclined surface for said device, said first roller engaging the surface and providing a pressure of the second roller to cause gripping action of the friction elements on the rod.

7. An exercising device comprising a longitudinal rod, a friction device slidably positioned on said rod, friction elements engaging the rod, a bar for moving the device on the rod, said bar having a slot therein, a roller in said slot, a second roller positioned above the first roller, means for holding the second roller in position relative to the first roller, and a wedge for said device and adapted to spread the rollers apart upon movement of the device in a predetermined direction.

7. An exercising device comprising a longiudinal rod, a friction device slidably positioned on said rod, friction elements engaging the rod, a bar for moving the device on the rod, said bar having a slot therein, a roller in said slot, a second roller positioned above the first roller and in constant engagement therewith, a wedge for said device and extending between said rollers only upon movement of the device in a predetermined direction to cause spreading action of said rollers.

GUSTAV E. SCHMIDT.